3,043,827
MONOAZO DYE COMPOUNDS FOR ACRYLIC FIBERS

James M. Straley and Raymond C. Harris, Kingsport, Tenn., assignors to Eastman Kodak Company, Rochester, N.Y., a corporation of New Jersey
No Drawing. Filed Mar. 14, 1960, Ser. No. 14,561
6 Claims. (Cl. 260—152)

This invention relates to new azo compounds and their application to the art of dyeing or coloring acrylic fibers.

As well known, polyacrylonitrile fibers are difficult to dye and their dyeing has presented problems. The polyacrylonitrile fibers commercially available usually contain over 85% polyacrylonitrile and few of the dyes offered for sale show affinity therefor. Thus, for example, the usual cellulose acetate disperse dyes have little or no affinity for polyacrylonitrile fibers.

It is an object of the invention to provide new azo dyestuffs. Another object is to provide new azo dyestuffs having affinity for polyacrylonitrile fibers. A further object is to provide dyed polyacrylonitrile materials having good fastness to light, gas, washing and sublimation. Another object is to provide a satisfactory process for preparing the new azo compounds of the invention.

The new azo compounds of the invention have the formula:

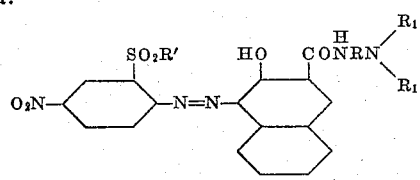

wherein R represents a member selected from the group consisting of an ethylene, a trimethylene and a β-hydroxytrimethylene radical, $R_1$ represents an alkyl group having 1 to 4 carbon atoms, R' represents an alkyl group having 1 to 2 carbon atoms and

collectively represents a member selected from the group consisting of a morpholinyl radical and a piperidyl radical. They dye acrylic fibers, such as Verel and Orlon 42, orange shades, for example, having good fastness to light, gas, washing and sublimation.

The new azo compounds of the invention are prepared by diazotizing an aminobenzene compound having the formula:

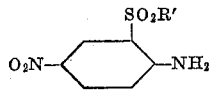

wherein R' represents an alkyl group having 1 to 2 carbon atoms and coupling the diazonium compound obtained with a naphthalene compound having the formula:

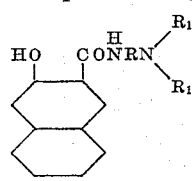

wherein R and

have the meaning previously assigned to them.

2-hydroxy-N-3-(β-dimethylaminoethyl)naphthamide, 2-hydroxy-N-3-(β-diethylaminoethyl)naphthamide, 2-hydroxy-N-3-(β-di-n-propylaminoethyl)naphthamide, 2-hydroxy-N-3-(β-di-n-butylaminoethyl)naphthamide, 2-hydroxy-N-3-(γ-dimethylaminopropyl)naphthamide, 2-hydroxy-N-3-(γ-diethylaminopropyl)naphthamide, 2-hydroxy-N-3-(γ-di-n-butylaminopropyl)naphthamide, 2-hydroxy-N-3-(γ-dimethylamino-β-hydroxypropyl)naphthamide, 2-hydroxy-N-3-(γ-diethylamino-β-hydroxypropyl)naphthamide, 2-hydroxy-N-3-(β-morpholinylethyl)naphthamide, 2-hydroxy-N-3-(γ-morpholinylpropyl)naphthamide, 2-hydroxy-N-3-(β-piperidylethyl)naphthamide and 2-hydroxy-N-3-(γ-piperidylpropyl)naphthamide are illustrative of the coupling components used in preparing the azo compounds of our invention.

The coupling components can be prepared by reacting 2-hydroxy-3-naphthoic acid chloride or 2-acetoxy-3-naphthoic acid chloride with an amine having the formula:

$$H_2N—R—N(R_1)_2$$

wherein R, $R_1$ and $N(R_1)_2$ have the meaning previously assigned to them. When 2-acetoxy-3-naphthoic acid chloride is employed the acetyl group is split off by known methods after the reaction with the amine is complete.

The following examples illustrate the invention.

Example 1

Nitrosylsulfuric acid was prepared by adding 0.72 gram of $NaNO_2$ to 20 cc. of 96% $H_2SO_4$ without cooling, the temperature rose to 70° C. The nitrosylsulfuric acid was cooled to 0° C. and then added to 50 cc. of propionic-acetic (1:5) acid, below 10° C. A solution of 2.16 grams of 2-methylsulfonyl-4-nitroaniline in 30 cc. of propionic-acetic (1:5) acid was added at 0° C. with stirring and stirring was continued for 2 hours longer while maintaining the reaction mixture below 5° C.

The diazo solution obtained as described above was added below 5° C., with stirring, to a solution of 2.7 grams of 2-hydroxy-N-3-(γ-dimethylaminopropyl)naphthamide in 50 cc. of propionic-acetic (1:5) acid. The mineral acid present was made neutral to Congo red paper by the addition of sodium acetate and then the reaction mixture was allowed to stand two hours without further cooling. The reaction mixture was neutralized with sodium carbonate. The azo compound which precipitated was recovered by filtration, washed with water and dried. The dye compound obtained has the formula:

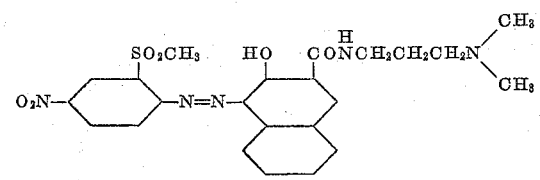

It dyes polyacrylonitrile textile materials, made of Verel or Orlon 42 acrylic fibers, for example, orange shades having good to excellent fastness to light, gas, washing and sublimation.

Example 2

2.3 grams of 2-ethylsulfonyl-4-nitroaniline were diazotized and the diazo solution obtained was coupled with 2.9 grams of 2-hydroxy-N-3-(β-diethylaminoethyl)naphthamide. Diazotization, coupling and recovery of the dye compound formed were carried out in accordance with the procedure described in Example 1. The dye compound obtained dyes polyacrylonitrile textile materials, made of Verel or Orlon 42 acrylic fibers, for example, orange shades having good to excellent fastness to light, gas, washing and sublimation.

Example 3

2.16 grams of 2-methylsulfonyl-4-nitroaniline were diazotized and the diazo solution obtained was coupled with 2.58 grams of 2-hydroxy-N-3-(β-dimethylaminoethyl) naphthamide. Diazotization, coupling and recovery of the dye compound formed were carried out in accordance with the procedure described in Example 1. The dye compound obtained dyes polyacrylonitrile textile materials, made of Verel or Orlon 42 acrylic fibers, for example, orange shades having good to excellent fastness to light, gas, washing and sublimation.

Example 4

2.16 grams of 2-methylsulfonyl-4-nitroaniline were diazotized and the diazo solution obtained was coupled with 2.86 grams of 2-hydroxy-N-3-(β-diethylaminoethyl) naphthamide. Diazotization, coupling and recovery of the dye compound formed were carried out in accordance with the procedure described in Example 1. The dye compound obtained dyes polyacrylonitrile textile materials, made of Verel or Orlon 42 acrylic fibers, for example, orange shades having good to excellent fastness to light, gas, washing and sublimation.

Example 5

2.16 grams of 2-methylsulfonyl-4-nitroaniline were diazotized and the diazo solution obtained was coupled with 3.16 grams of 2-hydroxy-N-3-(γ-diethylamino-β-hydroxypropyl)naphthamide. Diazotization, coupling and recovery of the dye compound formed were carried out in accordance with the procedure described in Example 1. The dye compound obtained dyes polyacrylonitrile textile materials, made of Verel or Orlon 42 acrylic fibers, for example, orange shades having good to excellent fastness to light, gas, washing and sublimation.

Example 6

2.16 grams of 2-methylsulfonyl-4-nitroaniline were diazotized and the diazo solution obtained was coupled with 3.14 grams of 2-hydroxy-N-3-(γ-morpholinylpropyl) naphthamide. Diazotization, coupling and recovery of the dye compound formed were carried out in accordance with the procedure described in Example 1. The dye compound obtained dyes polyacrylonitrile textile materials, made of Verel or Orlon 42 acrylic fibers, for example, orange shades having good to excellent fastness to light, gas, washing and sublimation.

Example 7

2.16 grams of 2-methylsulfonyl-4-nitroaniline were diazotized and the diazo solution obtained was coupled with 3.2 grams of 2-hydroxy-N-3-(γ-piperidylpropyl) naphthamide. Diazotization, coupling and recovery of the dye compound formed were carried out in accordance with the procedure described in Example 1. The dye compound obtained dyes polyacrylonitrile textile materials, made of Verel or Orlon 42 acrylic fibers, for example, orange shades having good to excellent fastness to light, gas, washing and sublimation.

The following tabulation further illustrates the azo compounds of the invention together with the color they produce on polyacrylonitrile textile materials, such as those made, for example, from Verel or Orlon acrylic fibers. The azo compounds indicated below are prepared by diazotizing the amines listed under the heading "Amine" and coupling the diazonium compounds obtained with the compounds specified in the column entitled "Coupling Component." The diazotization, coupling and recovery operations are carried out in accordance with the procedure described in Example 1.

| Amine | Coupling Component | Color |
|---|---|---|
| 2-methylsulfonyl-4-nitroaniline. | 2-hydroxy-N-3-(β-di-n-propylaminoethyl)naphthamide. | orange. |
| Do | 2-hydroxy-N-3-(β-di-n-butylaminoethyl)naphthamide. | Do. |
| Do | 2-hydroxy-N-3-(γ-diethylaminopropyl)naphthamide. | Do. |
| Do | 2-hydroxy-N-3-(γ-di-n-propylaminopropyl)naphthamide. | Do. |
| Do | 2-hydroxy-N-3-(γ-di-n-butylaminopropyl)naphthamide. | Do. |
| Do | 2-hydroxy-N-3-(γ-dimethylamino-β-hydroxypropyl)naphthamide. | Do. |
| Do | 2-hydroxy-N-3-(γ-di-n-butylamino-β-hydroxypropyl)naphthamide. | Do. |
| Do | 2-hydroxy-N-3-(β-morpholinylethyl)-naphthamide. | Do. |
| Do | 2-hydroxy-N-3-(β-piperidylethyl)-naphthamide. | Do. |
| Do | 2-hydroxy-N-3-(γ-piperidyl-β-hydroxypropyl)naphthamide. | Do. |
| 2-ethylsulfonyl-4-nitroaniline. | 2-hydroxy-N-3-(β-dimethylaminoethyl)naphthamide. | Do. |
| Do | 2-hydroxy-N-3-(β-di-n-butylaminoethyl)naphthamide. | Do. |
| Do | 2-hydroxy-N-3-(γ-dimethylaminopropyl)naphthamide. | Do. |
| Do | 2-hydroxy-N-3-(γ-diethylaminopropyl)naphthamide. | Do. |
| Do | 2-hydroxy-N-3-(γ-dimethylamino-β-hydroxypropyl)naphthamide. | Do. |
| Do | 2-hydroxy-N-3-(β-piperidylethyl)-naphthamide. | Do. |
| Do | 2-hydroxy-N-3-(β-morpholinylethyl)-naphthamide. | Do. |
| Do | 2-hydroxy-N-3-(γ-piperidylpropyl)-naphthamide. | Do. |

The dyeings obtained have good to excellent fastness to light, gas, washing and sublimation.

The diazo components used in preparing the azo compounds of the invention are old compounds. Most of the coupling components used in preparing the azo compounds of the invention appear to be specifically new although at least one of them, 2-hydroxy-3-N-(β-diethylaminoethyl)naphthamide, is an old compound being disclosed, for example, in U.S. Patents 2,128,255 and 2,128,256. These patents, however, fail in at least two respects to disclose the azo compounds of the invention. (1) They do not disclose the diazo components used in preparing the azo compounds of the invention and (2) the azo compounds disclosed therein contain "at least one sulfonic acid group" whereas the azo compounds of the invention do not contain a sulfonic acid group.

The preparation of the coupling components will be illustrated with reference to the preparation of 2-hydroxy-3-N-(γ-dimethylaminopropyl)naphthamide.

Example 8

188 grams of 2-hydroxy-3-naphthoic acid were slurried in 1000 cc. of dry benzene. A solution of 122 grams of $SOCl_2$ in 500 cc. of dry benzene was added over a period of 30 to 45 minutes. The reaction mixture resulting was stirred for 2.5 hours at room temperature, then raised slowly to 60° C. and held at this temperature until a clear solution resulted (about 2 hours). The excess $SOCl_2$, $SO_2$ and HCl was removed under vacuum while keeping the pot temperature at 60° C. or below. The last traces of $SOCl_2$, $SO_2$ and HCl were removed by passing a slow stream of dry air through the reaction mixture for about 15 minutes. The reaction mixture was cooled to 25° C. and 138 grams of anhydrous $K_2CO_3$ were added, after which a solution of 110 grams of γ-dimethylaminopropylamine in 300 cc. of dry benzene was added dropwise while keeping the pot temperature at 60° C. or below. The reaction mixture was stirred 6 hours longer at room temperature, then raised to 65° C. and filtered hot. The material collected on the filter was washed with three 2-liter portions of hot benzene. The combined filtrates were concentrated under vacuum to ⅓ their volume below 70° C. The reaction mixture was cooled to room temperature. The desired product which precipitated was recovered by filtration. A yield of 240 grams of 2-hydroxy-3-N-(γ-dimethylaminopropyl)naphthamide was obtained.

In the method, just illustrated, for the preparation of the coupling components an amine having the formula:

(A)         $H_2NRN(R_1)_2$ wherein R, $R_1$ and $N(R_1)_2$ have the meaning previously assigned to them, is employed.

β-Dimethylaminoethylamine [$H_2NCH_2CH_2N(CH_3)_2$], β-diethylaminoethylamine, β-di-n-propylaminoethylamine [$H_2NCH_2CH_2N(n-C_3H_7)_2$], β-di-n-butylaminoethylamine, γ-dimethylaminopropylamine, γ-diethylaminopropylamine, γ-di-n-propylaminopropylamine, γ-di-n-butylaminopropylamine [$H_2NCH_2CH_2CH_2N(n-C_4H_9)_2$], γ-dimethylamino-β-hydroxypropylamine

γ-diethylamino-β-hydroxypropylamine, γ-di-n-butylamino-β-hydroxypropylamine, γ-morpholinyl-β-hydroxypropylamine, γ-piperidyl-β-hydroxypropylamine, β-piperidylethylamine, γ-piperidylpropylamine, β-morpholinylethylamine, γ-morpholinylpropylamine

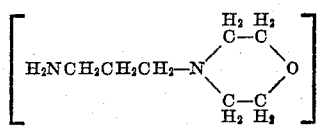

β-methylethylaminoethylamine

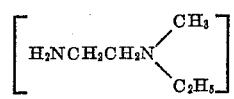

and γ-methylethylaminopropylamine

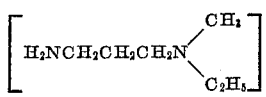

are illustrative of the amine compounds having the Formula A.

Following the general procedure described in Example 8 the other naphthamide coupling components are readily prepared.

Many of the primary amines having the Formula A are known compounds. Those that may not be specifically disclosed in the prior art can be prepared by the methods used to prepare the known compounds.

Two general processes by which primary amines having the Formula A can be prepared are set forth hereinafter:

(1) an amine having the formula:

(B)         $HN(R_1)_2$ is condensed with a chloroalkylnitrile having the formula: $Cl(CH_2)_xCN$, and the product obtained is reduced by sodium-alcohol or with hydrogen over Raney nickel to give:

(C)         $H_2N(CH_2)_{x+1}N(R_1)_2$ (2) Potassium phthalimide is condensed with a dibromoalkyl compound having the formula: $Br(CH_2)_zBr$, to obtain $C_6H_4(CO)_2N(CH_2)_zBr$ which is treated with (B) to give:

$C_6H_4(CO)_2N(CH_2)_zN(R_1)_2$ which is hydrolyzed with dilute mineral acid to give:

(D)         $H_2N(CH_2)_zN(R_1)_2$ the desired product. Method 2 is the well-known Gabriel synthesis.

In the two processes just described, $R_1$ represents an alkyl radical having 1 to 4 carbon atoms, X is 1 or 2, Z is 2 or 3 and $N(R_1)_2$ collectively represents the morpholinyl radical or the piperidyl radical.

The following example illustrates one way in which the azo compounds of the invention can be used to dye acrylonitrile polymer textile material. .1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried.

The expression "propionic-acetic (1:5) acid" refers to a mixture of propionic and acetic acids in which there are 5 parts by volume of acetic acid to 1 part by volume of propionic acid.

The invention has been described in detail with particular reference to preferred embodiments thereof, but it will be understood that variations and modifications can be effected within the spirit and scope of the invention as described hereinabove and as defined in the appended claims.

We claim:

1. The azo compounds having the formula:

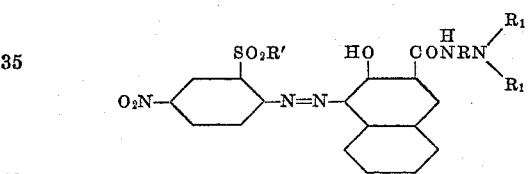

wherein R represents a member selected from the group consisting of an ethylene, a trimethylene and a β-hydroxytrimethylene radical, $R_1$ represents an alkyl group having 1 to 4 carbon atoms, R' represents an alkyl group having 1 to 2 carbon atoms and

collectively represents a member selected from the group consisting of a morpholinyl radical and a piperidyl radical.

2. The azo compound having the formula:

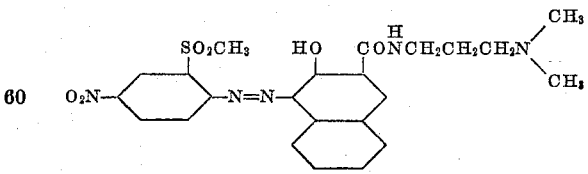

3. The azo compound having the formula:

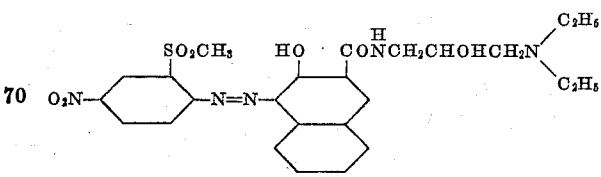

4. The azo compound having the formula:

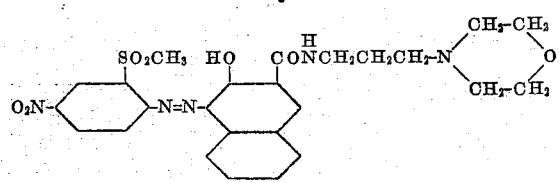
5. The azo compound having the formula:
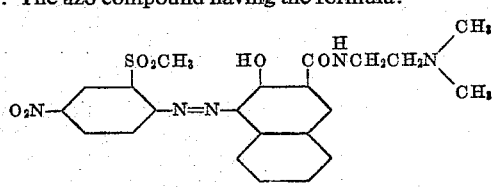
6. The azo compound having the formula:
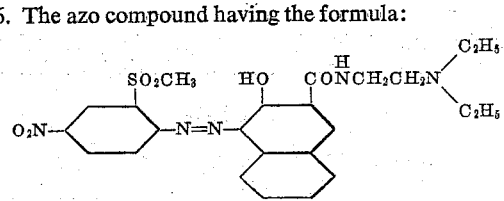
References Cited in the file of this patent
UNITED STATES PATENTS
| | | |
|---|---|---|
| 2,128,255 | Krzikalla et al. | Aug. 30, 1938 |
| 2,717,823 | Lowe | Sept. 13, 1955 |
| 2,891,942 | Merian | June 23, 1959 |